(12) United States Patent
Kawamura et al.

(10) Patent No.: US 10,168,939 B2
(45) Date of Patent: Jan. 1, 2019

(54) READING RECORDS FROM A TAPE MEDIUM

(71) Applicant: International Business Machines Corporation, Armonk, NY (US)

(72) Inventors: Kousei Kawamura, Tokyo (JP); Koichi Masuda, Tokyo (JP); Sosuke Matsui, Ishii (JP); Yutaka Oishi, Yokohama (JP); Takahiro Tsuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 14/950,447

(22) Filed: Nov. 24, 2015

(65) Prior Publication Data

US 2017/0147253 A1    May 25, 2017

(51) Int. Cl.
*G06F 3/06* (2006.01)
*G11B 27/00* (2006.01)

(52) U.S. Cl.
CPC .......... *G06F 3/0638* (2013.01); *G06F 3/0604* (2013.01); *G06F 3/0647* (2013.01); *G06F 3/0682* (2013.01); *G11B 27/00* (2013.01)

(58) Field of Classification Search
CPC ..................... G06F 3/06; G06F 3/0638; G06F 12/00–12/16; G06F 13/00–13/4295
See application file for complete search history.

(56) References Cited

U.S. PATENT DOCUMENTS

| | | | | |
|---|---|---|---|---|
| 5,153,746 A | * | 10/1992 | Satoh | H04N 1/00204 358/401 |
| 6,411,770 B1 | * | 6/2002 | Ito | G11B 27/034 386/239 |
| 6,577,814 B1 | * | 6/2003 | Ito | H04N 7/17336 348/E7.073 |
| 8,156,241 B1 | | 4/2012 | Mukherjee et al. | |
| 9,025,261 B1 | * | 5/2015 | Hasegawa | G11B 15/442 360/71 |
| 9,093,110 B2 | | 7/2015 | McCarty et al. | |
| 9,176,982 B2 | * | 11/2015 | Fontignie | G06F 11/1435 |
| 2003/0177269 A1 | * | 9/2003 | Robinson | H04L 41/12 709/246 |
| 2004/0085955 A1 | * | 5/2004 | Walter | H04L 63/0428 370/386 |

(Continued)

*Primary Examiner* — Nicholas J Simonetti
(74) *Attorney, Agent, or Firm* — Jared C. Chaney

(57) ABSTRACT

A method for operating a tape drive may include receiving a command to read a record stored on a tape by a tape drive having a capability to compress and decompress data. The tape drive compresses a record prior to writing the record to tape when a command to write the record to tape specifies that the record is to be compressed, and when a compressed size of the record is smaller than an uncompressed size of the record. The method further include reading the record from the tape by the tape drive, where the tape includes a plurality of compressed records and a plurality of uncompressed records. The method further includes determining by the tape drive whether the record is not compressed. The method may additionally include generating a compressed record by compressing the record by the tape drive when it is determined that the record is not compressed.

16 Claims, 2 Drawing Sheets

(56) References Cited

U.S. PATENT DOCUMENTS

| | | | | |
|---|---|---|---|---|
| 2009/0228761 A1* | 9/2009 | Perlmutter | .......... | G06F 11/1008 714/763 |
| 2011/0178988 A1* | 7/2011 | Satoyama | ............. | G06F 3/0608 707/649 |
| 2012/0030266 A1* | 2/2012 | Nemeth | .................. | H03M 7/60 708/203 |
| 2014/0237201 A1* | 8/2014 | Swift | .................. | H04L 67/1095 711/162 |
| 2014/0281168 A1* | 9/2014 | Koseki | ................. | G06F 11/108 711/103 |
| 2014/0281344 A1* | 9/2014 | Shin | ........................ | G06F 12/02 711/171 |
| 2015/0149739 A1* | 5/2015 | Seo | ....................... | G06F 3/0608 711/162 |
| 2015/0188566 A1* | 7/2015 | Lee | ......................... | H03M 7/48 710/106 |
| 2015/0355864 A1* | 12/2015 | Nishina | ................ | G06F 3/0608 711/114 |
| 2016/0004363 A1* | 1/2016 | Lin | ........................ | G06F 3/047 345/173 |
| 2016/0004636 A1* | 1/2016 | Yang | ................... | G06F 12/0895 711/118 |
| 2016/0092361 A1* | 3/2016 | Grimsrud | ............ | G06F 12/0238 711/102 |
| 2016/0173399 A1* | 6/2016 | Sporri | ..................... | H04L 67/06 709/246 |
| 2017/0004069 A1* | 1/2017 | Li | .......................... | G06F 12/08 |

* cited by examiner

READING RECORDS FROM A TAPE MEDIUM

BACKGROUND

The present disclosure relates to data storage systems, and more specifically, to retrieving data records from a tape storage medium.

Data storage systems are computing systems configured to manage the storage and retrieval of information for client computing systems. These storage systems may include one or more storage medium for storing information, and a storage controller for processing and servicing storage requests. One example of a data storage system are tape drives. Tape drives may store large amounts of data on magnetic tape media.

SUMMARY

According to embodiments of the present disclosure, a method for operating a tape drive may include receiving a command from a requestor to read a first record stored on a first tape by a tape drive having a capability to compress and decompress data. The tape drive compresses a record prior to writing the record to tape when a command to write the record to tape specifies that the record is to be compressed, and when a compressed size of the record is smaller than an uncompressed size of the record. The method may further include reading the first record from the first tape by the tape drive, where the first tape includes a first plurality of compressed records and a second plurality of uncompressed records. The method may further include determining by the tape drive, subsequent to the reading of the first record, whether the first record is not compressed. The method may additionally include generating a compressed first record by compressing the first record by the tape drive when it is determined that the first record is not compressed.

Various embodiments are directed towards a tape drive having a magnetic tape storage media having a first tape and a second tape and a storage controller having a processor and a memory, the memory having program instructions embodied therewith. The program instructions may be executable by the processor to cause the storage controller to receive a command from a requestor to read a first record stored on a first tape and to read the first record from the first tape by the tape drive, wherein the first tape includes a first plurality of compressed records and a second plurality of uncompressed records. The program instructions may be executable by the processor to further cause the storage controller to determine by the tape drive, subsequent to the reading of the first record, whether the first record is not compressed. The program instructions may be executable by the processor to further cause the storage controller to generate a compressed first record by compressing the first record by the tape drive when it is determined that the first record is not compressed.

Other embodiments are directed towards a computer program product to implement the tape drive, and the method for operating a tape drive.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
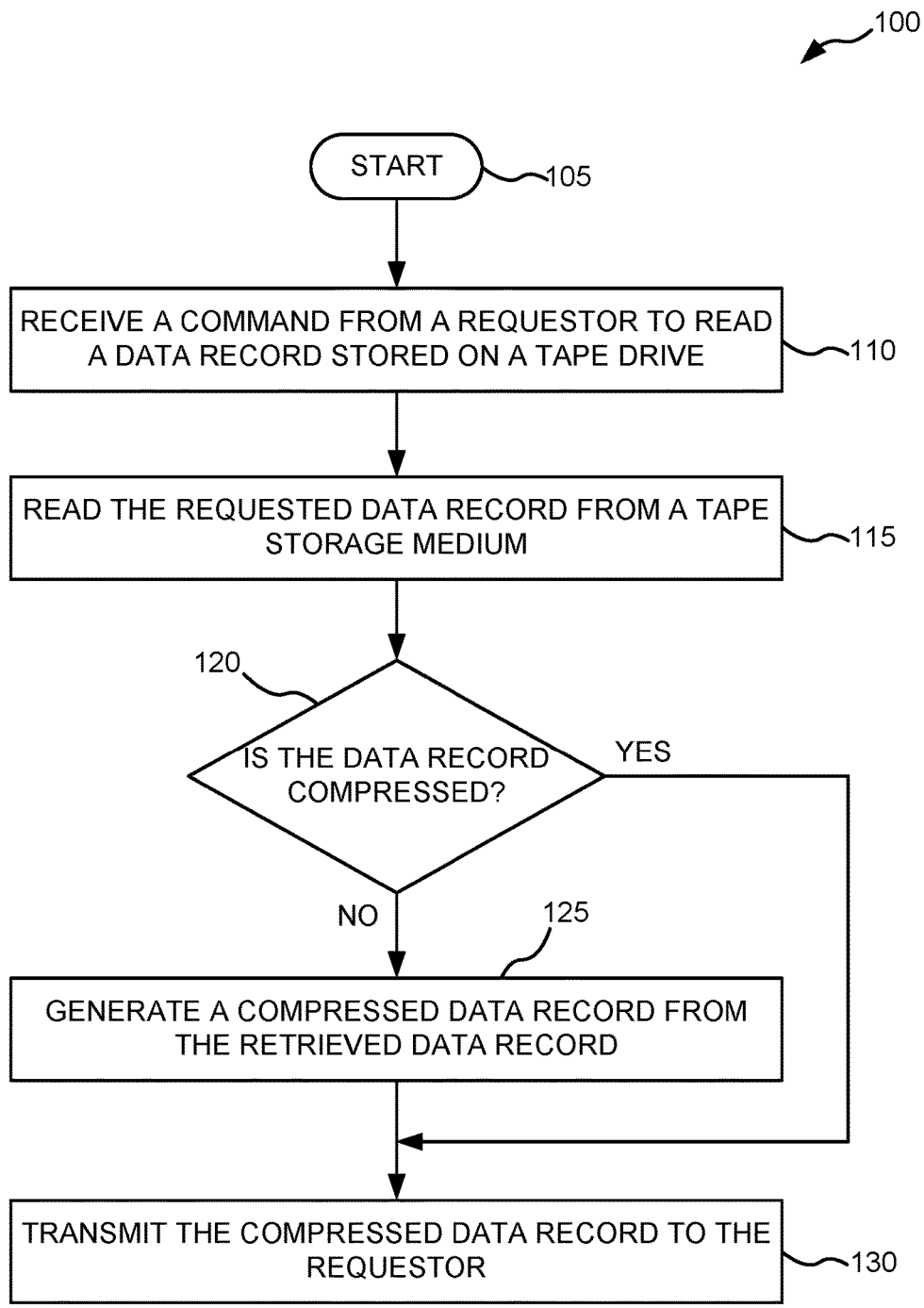
FIG. 1 a flowchart of computer implemented operations for retrieving a data record from a tape drive, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data storage systems, more particular aspects relate to retrieving data records from tape drives. While the present disclosure is not necessarily limited to such applications, various aspects of the disclosure may be appreciated through a discussion of various examples using this context.

Tape drive based data storage systems may provide a long term high capacity storage solution for entities by storing large amounts of data on reels of magnetic tape or tape storage media. Writing data to a tape drive storage system may include mechanically seeking to an unused (or free) area of the magnetic tape suitable to writing a data record. In some situations, a data record may be compressed by, for example, a storage controller, before being written to the magnetic tape. Consequently, distributions of compressed and uncompressed data records may be stored on a given tape drive storage system. Reading a data record from the tape drive storage system may include mechanically seeking to a second area of the tape storage media, retrieving the data record, and providing it to a client computing system. Due to the distribution of compressed and uncompressed data records stored on the tape drive storage system, the data record provided to the host computing may be compressed or uncompressed.

In some situations, a host computing system receiving a data record from a tape drive storage system in response to a read request may not be able to determine whether data record is in a compressed or uncompressed state. Consequently, a tape drive storage system may receive, subsequent to providing a data record to a host computing system, a request to determine whether the provided data record was compressed. This request may require an additional mechanical seek to the location of the transmitted record on the tape storage media, and an additional transmission on a data communication bus coupling the tape drive storage system to the host computing system. Servicing the request may reduce the performance tape storage drives. The reduction in performance may be particularly pronounced when the size of a data record is relatively small.

Embodiments of the present disclosure provide techniques for efficiently reading data from a tape drive storage system. These techniques are based on the recognition that the performance costs of associated with decompressing data using software executing on a host computing system may be less than the round trip performance costs associated with querying a tape drive to determine whether a received data record is compressed or uncompressed. According embodiments of the present disclosure, a tape drive storage controller may be configured to always return a compressed data record to a host computing system in response to receiving a request to read the data record. In some embodiments, returning a compressed data record may include compressing a data record which was previously uncompressed (e.g., the data record was not compressed before being written to the tape storage media), and then transmitting the compressed record to the host computing system.

As used herein, a data record may be a unit of variable (or fixed) length data. A data record may, for example, be a one mega-byte (e.g., 1 MB) unit of data. Furthermore, data compression, as discussed herein, may include any technique for transforming or mapping a raw (e.g., uncompressed) data record from a first representation to a second representation. Under some circumstances, the second representation may represent the data record using fewer bytes of data than the first representation. Under other circumstances, the second representation may represent the data record using more bytes of data than the first representation. For example, when a compression algorithm is applied to previously compressed data such as video data, the data size sometimes increases. This latter scenario may be referred to as an expansion.

As used herein, seeking to a data record stored on tape storage media (hereinafter, "tape media") may include electrical and mechanical operations to play or traverse a length of the magnetic tape until the data record is located. The data record may be located by, for example, read/write heads (e.g., sensors capable of reading and writing data on magnetic tape media) coupled to the tape media.

Figure 2:
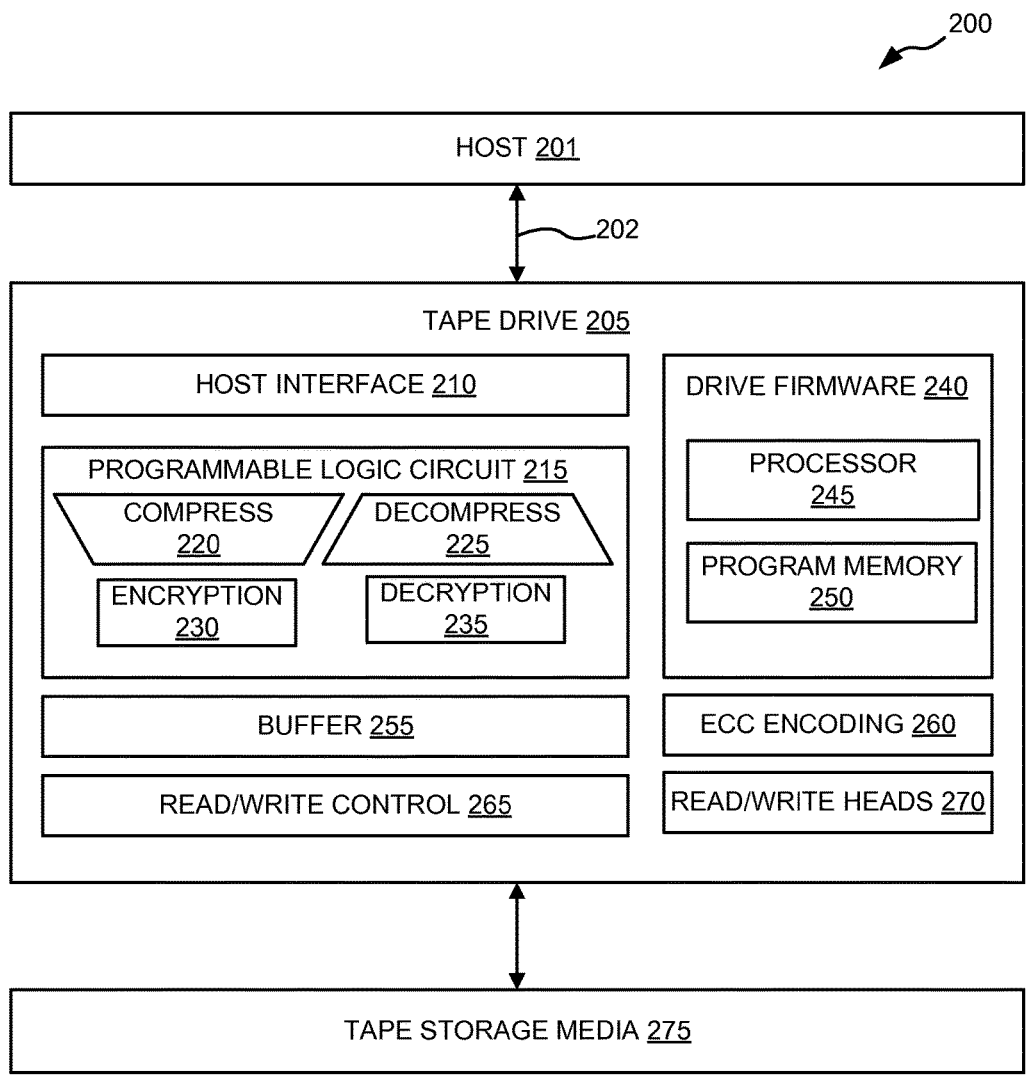
FIG. 2 depicts a block diagram of a system for retrieving data records from a tape drive, according to various embodiments.

Referring now to the figures, FIG. 1 depicts a flowchart 100 of computer implemented operations for retrieving a data record from a tape drive, according to various embodiments. The operations of flowchart 100, for example, may be performed by a tape drive storage controller in response to receiving a request from a host computing system to read a data record stored on tape media. In some embodiments, the operations of flowchart 100 may be performed by hardware and/or software components of a tape drive storage controller (hereinafter, "tape drive"). For example, the operations of flowchart 100 may be performed by tape drive 205 (FIG. 2).

The tape drive may begin the operations of flowchart 100 at operation 105 by receiving a command to write a record to the tape drive. The command may be received from a host computing system via a data bus coupling the tape drive to the computing system. In some embodiments, the tape drive may have a capability to compress and decompress a data record before and/or after writing it to the tape media. Under certain conditions, the received command may include an instruction to compress the data record before writing it. The tape drive, in response to receiving such a command, may compress the data record before writing it if compression would not result in an expansion. As mentioned, when a compression algorithm is applied to previously compressed data such as video data, the data size sometimes increases, resulting in an expansion. The tape drive may determine whether the compression would result in an expansion by compressing the data record and comparing the size of the compressed data record to the uncompressed data record. When the size of the compressed data record is larger than the size of the uncompressed data record (e.g., when compression results in an expansion), the tape drive may decide to write the data record without compressing it. When the size of the compressed data record is not larger than the size of the uncompressed data record, the tape drive may write the compressed record to the tape media. In some embodiments, the tape drive may verify the integrity of the compressed data record (e.g., by decompressing the record and comparing the decompressed record to the original uncompressed record) before writing it to the tape media.

The tape drive may continue the operations of flowchart 100 by executing operation 110. Executing operation 110 may include receiving a command from a host computing system (e.g., a requestor) to read a data record (e.g., a first record) stored on a reel of the tape media (e.g., a first tape). The request to may include a token or address for identifying the data record on the tape media. As with the request to write a data record, the request to read a data record may be received from the host computing system on a data bus coupling the tape drive to the host computing system.

The tape drive may continue execution of the operations of the flowchart 100 at operation 115 by reading the requested data record from the tape media. Reading the requested data record may include directing mechanical and electrical components (including, for example, read/write heads) associated with the tape drive to seek to an area of the tape media having the requested data record. In some embodiments, the area having the requested data record may be determined according to the token or address received in operation 110. Firmware or software executing on the tape drive may then direct the read/write heard to the requested data record into, for example, a memory buffer. The data record read into the memory buffer may be compressed or uncompressed depending whether the write command which caused the tape drive to previously write the requested data record included an instruction to compress the data record and on whether compression resulted in an expansion.

The tape drive may continue execution of the operations of the flowchart 100 at operation 120 by determining whether the requested data record is compressed. In some embodiments, the tape drive may maintain a data table having information on whether a record stored magnetic tape media associated with the tape drive is compressed. The tape drive may index the table using, for example, the token or address associated to the requested record, to determine whether the requested record is compressed. In some embodiments, the tape drive may write a token indicating whether the requested record is compressed along with the requested record, when the requested record is first written to the storage media. The tape drive may determine whether the data record was compressed by reading the token along with the data record. In certain embodiments, the tape drive may determine whether the data record is compressed according to the format of the data record. The tape drive may continue to operation 125 when the requested data record is compressed, while the tape drive may continue to operation 130 when the requested data record is not compressed.

The tape drive may execute operation 125 by generating a compressed data record (e.g., a compressed first record) from the requested data record. The tape drive may generate the compressed data record by, for example, transferring the requested data record (e.g., the data record stored in the memory buffer) to a compression engine associated with the tape drive. The compression engine may compress the data record and provide the compressed data record to the tape drive in a second memory buffer. In some embodiments, the tape drive may compress the data record even when compression results in expansion.

The tape drive may execute operation 130 by transmitting the compressed data record to the host computing system. In some embodiments, the tape drive may transmit the compressed data record to the host computing system by, for example, forming a data bus packet having the compressed data record and a destination address associated with the host computing system. The tape drive may then transfer the data packet to the data bus coupling the tape drive to the host computing system. In some embodiments, the tape drive may transfer the compressed data record, along with a destination memory address accessible to the host computing system, to a dynamic memory access (DMA) controller. The DMA controller may then transmit or transfer the data packet to the indicated destination memory address.

While an example embodiment of the operations of flowchart 100 is described herein, other variants of the flowchart 100 are contemplated. In some variants one or more operations of the flowchart 100 may be executed in a different order than indicated in FIG. 1. In other embodiments, additional operations may be added to further the execution of the operations of flowchart 100.

FIG. 2 depicts a block diagram of a system 200 for retrieving data records from a tape drive, according to various embodiments. In some embodiments, the system 200 may include host computing system 201, tape drive 205, and tape storage media 275.

The host computing system 201 may be a computing device having, for example, a memory, one or more processors executing computer readable code, and one or more data buses for exchanging data between components of the computing device and other computing devices/systems. In addition, the host computing system 201 may include various volatile and non-volatile memories, such as DRAM, hard drive, flash drive. Further, the host computing system 201 may include a direct memory access controller. The host computing system 201 may be coupled to tape drive 205 by bus 202. In some embodiments, the bus 202 may be data bus such as a small computer system interface (SCSI) bus. In certain embodiments, the bus 202 may be a network communication channel. The host computing system 201 may transfer data to, or receive data from, tape drive 205 via direct option of the one or more processors to transfer data from a memory associated with the host computing system to the bus 202. The host computing system 201 may additionally transfer data to, or receive data from, the tape drive 205 by operation of a DMA controller.

The tape drive 205 may be a computing device configured to implement the operations of the present disclosure when processing requests to write data to, and/or read data from, tape storage media 275 9 (e.g., tape media). The tape drive 205 may include host interface component 210, programmable logic circuit 215, drive firmware 240, buffer 255, error correcting code (ECC) encoding component 260, read/write control component 265, and read/write heads 270.

In some embodiments, the host interface component 210 may be a DMA controller coupled to a bus 202. The DMA controller may receive a destination memory address and a data record from the tape drive 205 for writing a data record of an area memory accessible to the host computing system 201. The DMA controller may then transfer the data record to the destination memory address via bus 202 according arbitration protocols defined for the bus. In some embodiments, the host interface component 210 may be a SCSI interface logic block configured to transfer data over of a SCSI interface, or logic block having a network communication protocol stack for transferring data over a data communication network. In some situations, the tape drive 205 may receive a request to write and/or read a data record from the host computing system 201 via host interface component 210. The request may then be transferred to a memory buffer accessing to the tape drive 205 (e.g., buffer 255) for processing. Furthermore, the tape drive 205 may transfer a compressed data record to the host computing system 201 via host interface 210 by transferring the data compressed data record to a second memory buffer accessible to the host interface and actuating appropriate logic circuits of the host interface for transmitting the record to the host computing system.

Programmable logic circuit 215 may include one or more programmable logic devices, such as field programmable gate arrays, application specific logic devices, and programmable logic arrays. The programmable logic circuit 215 may receive (e.g., via buffer 255) a data record from tape drive 205 along information and/or an instruction for compressing the data record. The data record may be a data record received as part of a write request from the host computing system 201. The data record may alternatively be a data record read from tape storage media 275. The programmable logic circuit 215 may compress the data record using compression component 220. In some embodiments, the programmable logic circuit 215 may provide feedback information to the tape drive 205 indicating, for example, the size of the compressed record. In certain embodiments, the tape drive 205 may direct the programmable logic circuit 215 to encrypt the compressed data record using encryption component 230. The programmable logic circuit 215 may provide the compressed and/or encrypted data record to the tape drive 205 by, for example, transferring the record to buffer 255.

In certain situations, the tape drive 205 may transfer a data record to programmable logic circuit 215 for decryption and/or decompression. For example, the tape drive 205 may read an encrypted data record from tape storage media 275, and forward it to programmable logic circuit 215 for decryption before transmitting to the record to the host computing system 201. As another example, the table drive 205 may attempt to verity the integrity of a compressed data record by forwarding the compressed record to programmable logic circuit 215 for decompression. The programmable logic circuit 215 may decompress the data record using decompression component 225. Furthermore, the programmable logic circuit 215 may decrypt the data record using decryption component 235. The decompressed and/or decrypted data record may then be returned to tape drive 205 by, for example, writing it to buffer 255.

Drive firmware component 240 may include a processor 245 and a program memory 250. The processor 245 may be configured to execute computer readable code stored in the program memory 250 for performing the operations of the present disclosure. More specifically, the processor 245 may execute the computer readable code to direct the host interface component 210 to receive data from, and transfer data to, host computing system 201. The processor 245 may further execute the computer readable code to direct programmable logic circuit 215 to compress, encrypt, decompress, and decrypt data records, as described herein. The processor 245 may further execute the computer readable code to encode the data records with ECC data using ECC encoding component 260. Furthermore, the processor 245 may execute computer readable code to configure read/write control component 265 to direct read/write heads 270 to write data to, and/or read data from, tape storage media 275. The processor 245 may additionally execute the computer readable code stored in program memory 250 to execute the operations of the flowchart 100.

The tape storage media 275 may include one or more reels of magnetic tape coupled to electrical and mechanical assemblies for playing the tape media in a forward and/or backward direction. Mechanical components of the assembly may include motors and gears for actuating the reels, while electrical components may include control and power circuits for actuating the motors. The control and power circuits may actuate the motors turning each real in response to signals received from tape drive 205. The tape of each reel may be configured with one or more tracks of magnetic material extending along the length of the tape. The magnetic material may be configured to store data according to an orientation of the magnetic poles of the magnetic material. The information stored on the magnetic material may be readable and/or writeable by one or more read/write heads coupled to tape drive 205. The stored information may include a set of one or more compressed or uncompressed data records.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   receiving, by a tape drive, a first record;
   storing the first record on a first tape in the tape drive in an uncompressed format;
   receiving a command from a requestor to read the first record stored on the first tape by the tape drive, wherein the tape drive has a capability to compress and decompress data;
   reading the first record from the first tape by the tape drive, wherein the first tape includes a first plurality of compressed records and a second plurality of uncompressed records;
   determining, by the tape drive, subsequent to the reading of the first record that the first record is not compressed;
   generating a compressed first record by compressing the first record by the tape drive when it is determined that the first record is not compressed;
   determining that the first record is encrypted;
   transferring the first record, in a compressed format, to a programmable logic circuit for decryption before transmitting to the first record to the requestor; and
   transmitting the compressed first record by the tape drive to the requestor.

2. The method of claim 1, wherein the transmitting further comprises transmitting to a memory of the requestor using a direct memory access mechanism.

3. The method of claim 1, wherein the tape drive does not compress a record prior to writing the record to tape when:
   a command to write the record to tape specifies that the record is to be compressed, and
   a compressed size of the record is larger than an uncompressed size of the record.

4. The method of claim 1, wherein the requestor does not store information enabling the requestor to determine whether a record stored on tape is included in the second plurality of uncompressed records.

5. The method of claim 1 further comprising determining that a performance cost associated with the decompressing of the first record by the requestor would be less than the cost associated with querying the tape drive to determine if the record is compressed.

6. A tape drive comprising:
   a magnetic tape storage media having a first tape and a second tape;
   a storage controller having a processor and a memory, the memory having program instructions embodied therewith, the program instructions executable by the processor to cause the storage controller to:
   receive a first record;
   store the first record on the magnetic tape storage media in an uncompressed format;
   receive a command from a requestor to read the first record stored on a first tape;
   read the first record from the first tape by the tape drive, wherein the first tape includes a first plurality of compressed records and a second plurality of uncompressed records;
   determine by the tape drive, subsequent to the reading of the first record, that the first record is not compressed;
   generate a compressed first record by compressing the first record by the tape drive when it is determined that the first record is not compressed;
   determine that the first record is encrypted;
   transfer the first record, in a compressed format, to a programmable logic circuit for decryption before transmitting to the first record to the requestor; and
   transmit the compressed first record to a requestor.

7. The tape drive of claim 6, wherein the transmitting further comprises transmitting to a memory of the requestor using a direct memory access mechanism.

8. The tape drive of claim 6, wherein a requestor does not store information enabling the requestor to determine whether a record stored on tape is included in the second plurality of uncompressed records.

9. The tape drive of claim 6, wherein the storage controller has a capability to compress and decompress data, the storage controller configured to compress a record prior to writing the record to tape when:
   a command to write the record to tape specifies that the record is to be compressed, and
   a compressed size of the record is smaller than an uncompressed size of the record.

10. The tape drive of claim 9, wherein the storage controller does not compress a record prior to writing the record to tape when:
    a command to write the record to tape specifies that the record is to be compressed, and
    a compressed size of the record is larger than an uncompressed size of the record.

11. The tape drive of claim 6 wherein the program instructions executable by the processor to further cause the storage controller to determine that a performance cost associated with the decompressing of the first record by the requestor would be less than the cost associated with querying the tape drive to determine if the record is compressed.

12. A computer program product for read data from a tape drive, the computer program product including a computer readable storage medium having program instructions embodied therewith, wherein the computer readable storage medium is not a transitory signal per se, the program instructions executable by a processing circuit to cause the processing circuit to perform a method comprising:
    receiving, by the tape drive, a first record;
    storing the first record on a first tape in the tape drive in an uncompressed format;

receiving a command from a requestor to read the first record stored on the first tape by the tape drive,
  wherein the tape drive has a capability to compress and decompress data;
reading the first record from the first tape by the tape drive, wherein the first tape includes a first plurality of compressed records and a second plurality of uncompressed records;
determining, by the tape drive, subsequent to the reading of the first record that the first record is not compressed;
generating a compressed first record by compressing the first record by the tape drive when it is determined that the first record is not compressed;
determining that the first record is encrypted;
transferring the first record, in a compressed format, to a programmable logic circuit for decryption before transmitting to the first record to the requestor; and
transmitting the compressed first record by the tape drive to the requestor.

13. The computer program product of claim 12, wherein the transmitting further comprises transmitting to a memory of the requestor using a direct memory access mechanism.

14. The computer program product of claim 12, wherein the tape drive does not compress a record prior to writing the record to tape when:
  a command to write the record to tape specifies that the record is to be compressed, and
  a compressed size of the record is larger than an uncompressed size of the record.

15. The computer program product of claim 12, wherein the requestor does not store information enabling the requestor to determine whether a record stored on tape is included in the second plurality of uncompressed records.

16. The computer program product of claim 12, the method further comprising determining that a performance cost associated with the decompressing of the first record by the requestor would be less than the cost associated with querying the tape drive to determine if the record is compressed.

* * * * *